United States Patent
Mauk

(10) Patent No.: US 12,351,739 B1
(45) Date of Patent: Jul. 8, 2025

(54) HOT-MELT ADHESIVE AND METHOD OF MAKING SAME USING RECYCLED POLYMER MATERIALS

(71) Applicant: Jeffrey Mauk, Boonville, IN (US)

(72) Inventor: Jeffrey Mauk, Boonville, IN (US)

( * ) Notice: Subject to any disclaimer, the term of this patent is extended or adjusted under 35 U.S.C. 154(b) by 0 days.

(21) Appl. No.: 18/829,594

(22) Filed: Sep. 10, 2024

(51) Int. Cl.
*C09J 125/06* (2006.01)
*C09J 11/08* (2006.01)
*C09J 123/06* (2006.01)
*C08J 3/20* (2006.01)

(52) U.S. Cl.
CPC ............. *C09J 125/06* (2013.01); *C09J 11/08* (2013.01); *C09J 123/06* (2013.01); *C08J 3/203* (2013.01)

(58) Field of Classification Search
CPC ......... C09J 125/06; C09J 123/06; C09J 11/08
See application file for complete search history.

(56) References Cited

U.S. PATENT DOCUMENTS

| | | | | |
|---|---|---|---|---|
| 5,197,678 A | * | 3/1993 | Trezek | ..................... B29B 13/10 241/DIG. 38 |
| 6,326,408 B1 | | 12/2001 | Jura | |
| 2017/0022399 A1 | * | 1/2017 | Isobe | ..................... C08L 25/06 |

FOREIGN PATENT DOCUMENTS

| | | | | |
|---|---|---|---|---|
| CN | 1213683 A | * | 4/1999 | |
| WO | WO-2012147951 A1 | * | 11/2012 | ........... B65D 23/085 |

OTHER PUBLICATIONS

Paraffin information. Chembook. https://www.chemicalbook.com/ChemicalProductProperty_EN_CB5266104.htm. As viewed on Oct. 25, 2024. (Year: 2024).*
Machine Translation of WO2012147951A1. Nov. 1, 2012 (Year: 2012).*
Machine Translation of CN1213683A. Apr. 14, 1999 (Year: 1999).*
Makabe et al. Preparation of a Hot-melt Adhesive from Expanded Polyurethane Waste and Evaluation of its Adhesion Properties. Journal of the Japan Society of Material Cycles and Waste Management, 2012, 23(3), 138-143 (Year: 2012).*
Xu et al. The study of Hot Melt Adhesive was Manufactured by Using PSF. Chemistry and Adhesion, 2005, 27(2), 112-114. (Year: 2005).*
American Chemical Society. Lesson 5.6: Does Temperature Affect Dissolving? https://www.acs.org/middleschoolchemistry/lessonplans/chapter5/lesson6.html. Aug. 25, 2023. (Year: 2023).*
Berry, K. Technical Paper—Introduction to Hot Melt Adhesives. https://www.chemiqueadhesives.com/us/introduction-to-hot-melt-adhesives/#. Aug. 2021. (Year: 2021).*
Crowley Chemical Company, Inc, Preliminary Technical Data Sheet: Vycel U: Low viscosity diluent of PU systems with excellent particle wetting, Technical Bulletin, (Jun. 2, 2013), New York, NY, U.S.
Atmos Technologies, A viscosity-reducing diluent: Vycel EF, (Mar. 23, 2022), Newtown Square, PA, U.S.
Resinall Corp, Resinall 625, Technical Data, (n.d.), Stamford, CT, U.S.
Resinall Corp, Resinall 769, Technical Data, (n.d.), Stamford, CT, U.S.
Resinall Corp, Resinall 1000 Hydrogenated Hydrocarbon Resin, Product Data, (Apr. 10, 2014), Stamford, CT, U.S.
Huntsman Advanced Materials Americas Inc, Araldite GY 6010: A Medium Viscosity Unmodified Liquid Epoxy Resin, Advanced Materials, (Jul. 3, 2007), The Woodlands, TX, U.S.
Neville Chemical Company, Nevchem 2020, Technical Data Sheet, (Nov. 19, 2019), Pittsburgh, PA, U.S.
Momentive Performance Materials Inc, Silquest A-187: Epoxy functional silanes, Technical Data Sheet, Oct. 13, 2021), Niskayuna, NY, U.S.

* cited by examiner

*Primary Examiner* — Stephen E Rieth
(74) *Attorney, Agent, or Firm* — Martin IP Law Group; C. Richard Martin

(57) ABSTRACT

A hot-melt adhesive having a base made from a process oil and recycled expanded polystyrene (EPS) or recycled expanded polyethylene (EPE) is provided. Additional materials such as tackifiers and/or fillers can be added to adjust the specific properties of the adhesive for its intended use. A method of making the hot-melt adhesive using a base comprising a process oil and recycled expanded polystyrene (EPS) or recycled expanded polyethylene (EPE) is also provided.

8 Claims, No Drawings

HOT-MELT ADHESIVE AND METHOD OF MAKING SAME USING RECYCLED POLYMER MATERIALS

BACKGROUND OF THE INVENTION

Field of the Invention

This disclosure relates generally to hot-melt adhesives, and more particularly to a hot-melt adhesive having a base mixture of an aromatic hydrocarbon oil and a polymer such as recycled expanded polystyrene (EPS) or expanded polyethylene (EPE).

Description of the Related Art

Hot-melt adhesive (HMA), also known as hot glue, is a form of thermoplastic adhesive that is commonly sold as solid cylindrical sticks of various diameters or pellets designed to be applied using a hot glue gun. The gun uses a continuous-duty heating element to melt the plastic glue, which the user pushes through the gun either with a mechanical trigger mechanism on the gun, or with direct finger pressure. The glue squeezed out of the heated nozzle is initially hot enough to burn and even blister skin. The glue is sticky when hot, and solidifies in a few seconds to one minute.

Hot-melt adhesives are often sold in sticks or cartridges suited to the intended glue gun. Bulk pellets are also used: these are dumped or transported to an adhesive reservoir for subsequent application. Large open-head drums are also used for high volume application. Hot-melt drum pumps have a heated platen which melts the adhesive for pumping through heated hoses.

In industrial use, hot-melt adhesives provide several advantages over solvent-based adhesives. Volatile organic compounds are reduced or eliminated, and the drying or curing step is eliminated. Hot-melt adhesives have a long shelf life and usually can be disposed of without special precautions. Some of the disadvantages involve thermal load of the substrate, limiting use to substrates not sensitive to higher temperatures, and loss of bond strength at higher temperatures, up to complete melting of the adhesive.

Expanded Polystyrene (EPS) is a rigid and tough, closed-cell foam with a normal density range of 11 to 32 kg/m$^3$. It is usually white and made of pre-expanded polystyrene beads. EPS is used for food containers, molded sheets for building insulation, and packing material either as solid blocks formed to accommodate the item being protected or as loose-fill "peanuts" cushioning fragile items inside boxes.

Expanded polyethylene (EPE) refers to foams made from polyethylene. EPE foams are low density, semi-rigid, closed cell foam that are generally somewhere in stiffness/compliance between EPS and Polyurethane. EPE can be used to replace both EPS, and both rigid and flexible polyurethane. Uses include cushioning applications, and impact absorption applications including packaging.

The use of EPS and EPE, particularly in packaging, creates an issue of waste. EPS and EPE are recyclable, but because they are lightweight, bulky, and difficult to clean due to their porous nature and common usage in food packaging, it's a costly material to recycle at an efficient scale. Most curbside recycling programs don't accept EPS materials, or don't have the capability to recycle them.

When EPS and EPE takes up space in landfills, it becomes an even bigger waste management concern. By many accounts, it can take up to 500 years for EPS and EPE to decompose, and because it is essentially non-biodegradable waste, it can also leach chemicals into the surrounding environment.

Accordingly, there is a need for a hot-melt adhesive that can be quickly and easily made where the polymer used is selected from a group consisting of recycled EPS or EPE. This reduces the waste created by the use of EPS and EPE in packaging materials, preventing them from ending up in a landfill. It also provides the maker of the hot-melt adhesive with a ready, cheap and ample supply of polymer for the hot-melt adhesive.

SUMMARY OF THE INVENTION

It is therefore an object of the present invention to provide a hot-melt adhesive that can be made using recycled expanded polystyrene (EPS) or recycled expanded polyethylene (EPE) as the polymer in the base.

It is also an object of the invention to provide a productive use for EPS and EPE since they cannot be easily recycled by traditional means.

The present invention meets these objects by providing a hot-melt adhesive wherein the base is comprised of a process oil mixed with approximately equal parts by weight of either recycled EPS or EPE. The present invention further provides a method of making a hot-melt adhesive wherein the base comprises a processing oil and recycled EPE or EPS.

According to one presently preferred embodiment of the invention, there is provided a hot-melt adhesive comprising substantially equal parts of a process oil and a polymer. The process oil is preferably an aromatic hydrocarbon oil and may be VYCEL-U. The polymer may be selected from a group consisting of polystyrene and polyethylene, and may preferably be expanded polystyrene or expanded polyethylene. The process oil preferably has a boiling point of at least 300 degrees F.

The hot-melt adhesive may further comprise one or more tackifiers. The one or more tackifiers may be selected from a group consisting of hydrocarbon resins, rosin resins, terpene resins, and their mixtures.

According to a further aspect of the present invention, there is provided a method of making a hot-melt adhesive. First, a process oil is heated to a desired temperature that is below a boiling point of the process oil. A polymer is then added to and dissolved in the heated process oil. Polymer is added and dissolved until the hot-melt adhesive includes substantially equal parts process oil and polymer. The process oil and polymer mixture is then cooled to room temperature resulting in a solid-form hot-melt adhesive.

The step of heating a process oil may comprise heating an aromatic hydrocarbon oil to a temperature between 170 degrees F. and a boiling point of the aromatic hydrocarbon. The step of adding a polymer to and dissolving the polymer in the heated process oil may comprise adding a polymer selected from a group consisting of polyethylene and polystyrene. The step of adding a polymer to and dissolving the polymer in the heated process oil may comprise adding a polymer selected from a group consisting of expanded polyethylene and expanded polystyrene.

The method may further comprise the step of adding one or more tackifiers and dissolving the one or more tackifiers in the process oil and polymer. The one or more tackifiers may be selected from a group consisting of hydrocarbon resins, rosin resins, terpene resins, and their mixtures.

These and other objects, features and advantages of the present invention will become apparent from a review of the following drawings and detailed description of the preferred embodiments of the invention.

DETAILED DESCRIPTION OF THE INVENTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

One presently preferred embodiment of the invention comprises an adhesive/sealant formed from a mixture of a process oil and a polymer. The process oil is preferably an aromatic hydrocarbon oil such as VYCEL U. The polymer is preferably selected from a group consisting of polystyrene and polyethylene. Other materials, such as tactifiers, stearic acids, and fillers can be added to the mixture to alter the properties of the adhesive/sealant.

The aromatic hydrocarbon oil suitable for use in the invention may be any hydrocarbon oil that has an initial boiling point greater than 300° F. at 1 atmosphere pressure (defined as 760 mm pressure) and that does not require a carcinogen or a suspect carcinogen label for sales in the United States. The process oil is preferably an oil where 100% by weight of its constituents are aromatic compounds. However, it is anticipated that process oils with a lower percentage by weight (50% or greater) of aromatic compounds could be used. Preferably, the oil contains approximately 65% biphenyl content. The process oil suitable for use in the invention preferably has a viscosity (at 75° F.) of approximately 7 Brookfield cps, a specific gravity (at 60° F.) of approximately 0.95, and a refractive index of 1.55.

The preferred process oils suitable for use in the invention are not listed as carcinogenic or as suspect carcinogens according to OSHA, NTP, IARC, or California Proposition 65. The commercial oils preferably do not require a carcinogen or a suspect carcinogen label for sale in the United States.

An example of a particularly preferred commercial aromatic process oil that meets these requirements (as of January 2024) is VYCEL U oil that is commercially available from Crowley Chemical Co. It is generally considered to be a low viscosity diluent of PU systems with excellent particle wetting. It is considered to have a mild petroleum odor. The initial boiling point (IBP) of VYCEL U oil is 390° F. at 1 atmosphere pressure, according to ASTM D-86. The flash point of VYCEL U oil is 280° F. (COC) according to ASTM D-92. Due to its high flash point, this oil is not considered flammable. The viscosity of VYCEL U oil is 7 cps at room temperature. The specific gravity of VYCEL U (at 60° F.) is 0.95. A similarly suitable aromatic process oil that can be used is VYCEL EF, which is also commercially available from Crowley Chemical Co. VYCEL EF is a viscosity-reducing diluent with very low color and a low odor level for Polyurethane and Epoxy systems. VYCEL EF is very hydrophobic and is completely compatible with Epoxy, Phenolics, MDI, TDI and their Prepolymers. The flash point of VYCEL EF oil is 350° F. (COC) according to ASTM D-92. Due to its high flash point, this oil is not considered flammable. The viscosity of VYCEL EF oil is 22 cps at 75° F. The specific gravity of VYCEL EF (at 60° F.) is 1.01. Another option is VYCEL P which is a non-carcinogenic, hydrophobic, low HAPs containing polyester modifier. Improves impact resistance, reduces shrinkage, and improves tensile strength.

The polymers that are suitable for use in connection with the invention include polystyrene and polyethylene. Both are impact resistant, lightweight, and available in many different forms, making them ideal for a wide variety of uses. Both are also commonly available to be reused as recycled material.

Polystyrene is a thermoplastic that's solid at room temperature but will begin to melt at 410 degrees F. Once melted, polystyrene can be reshaped into new forms, then cooled until solid—making it a great candidate for recycling. All forms of polystyrene are somewhat resistant to acids and bases, making them reliable for day-to-day usage. The foam variety of polystyrene is often referred to as Styrofoam or expanded polystyrene (EPS). This foam is rigid but able to absorb and disperse significant pressure due to its structural strength and low density.

Polyethylene is the most chemically simple polymer, comprised of nothing but carbon and hydrogen. Due to its molecular makeup, it's highly resistant to chemicals, UV light, and moisture. As a thermoplastic, it can constantly be melted, reformed, and cooled into new shapes again and again, making it a great candidate for recycling. Polyethylene is also quite durable, making some of its forms popular for packaging heavy items, and other forms ideal for sheer impact resistance. Expanded polyethylene (EPE) refers to foams made from polyethylene. EPE foams are low density, semi-rigid, closed cell foam that are generally somewhere in stiffness/compliance between expanded polystyrene and polyurethane. Both Styrofoam and EPE are commonly used in packing material which are abundantly available for recycling.

Both polystyrene and polyethylene have substantially lower melting points when placed in a liquid bath of an aromatic hyrdrocarbon oil such as VYCEL U. When placed in a bath of VYCEL U at 172° F., both polystyrene and polyethylene melt quickly and can be combined with the VYCEL U to form a new adhesive compound.

According to the present invention, a new adhesive material is formed by first heating a bath of process oil, preferably VYCEL U to approximately 172° F. Once the process oil reaches the desired temperature, a polymer (either polystyrene or polyethylene) is added to the process oil. The temperature of the solution is maintained at approximately 172° F. until the polymer has completely dissolved in the process oil. Additional polymer pieces may be added to the mixture until such time as the desired mixture is reached. Preferably, the completed mixture will contain approximately equal parts by weight of process oil and polymer.

Once the base compound having approximately equal parts process oil and polymer has been reached, additional materials, such as tackifiers, stearic acids, and fillers can be added to the to alter the properties of the compound to give it certain desired properties.

Tackifiers are chemical compounds used in formulating adhesives to increase tack, the stickiness of the surface of the adhesive. They are usually low-molecular weight compounds with high glass transition temperature. Tackifiers frequently represent most of both weight percentage and cost of hot melt adhesives and pressure-sensitive adhesives. In hot melt adhesives they can comprise up to about 40% of total mass. Tackifiers are usually hydrocarbon resins, rosin resins, terpene resins, and their mixtures.

Tackifiers for hot melt applications are preferably comprised of hydrogenated hydrocarbon resins. Resinall Corporation produces a variety of these resins including fully and partially hydrogenated versions. These resins have very low color, low odor, and excellent thermal stability. They tackify a variety of elastomers including metallocene, ethylene vinyl acetate (EVA), styrenic block copolymers (SIS, SBS, and SEBS), and amorphous polyalpha olefins. This balance of properties makes these resins ideally suited for use in hot melt adhesives for packaging and non-woven assembly.

The following is one specific example of the process of forming an adhesive (CCT-36) according to the present invention. First, 40 g of VYCEL U are added to the mixing vessel and heated to a temperature of 172° F. Next, 43 g of expanded polystyrene (EPS) is added to the liquid VYCEL U. The temperature is maintained at approximately 172° F. until the EPS has fully melted/dissolved and mixed with the VYCEL U. Next, a 25 g of Resinall 625 tackifier is added, followed by 25 g of Resinall 769 tackifier. Resinall 625 has a softening point of 90 C (194 F) and Resinall 769 has a softening point of 111 C (231.8 F) using the RTM-100 testing method. Another 20 g of Resinall 625, followed by another 20 g of Resinall 769 is then added to the mixture. Finally, 15 g of paraffin wax is added. Once all of the tackifiers have mixed with the VYCEL/EPS solution, the heat source is removed and the mixture is allowed to cool to room temperature and solidify. If the resulting mixture is too soft, calcium carbonate ($CaCO_3$) can be added to firm it up. In one example, 20 g of calcium carbonate is added to the above mixture to form adhesive CCT-37. In another embodiment, 30 g of calcium carbonate is added to the above mixture (CCT-36) to form adhesive CCT-38.

Adhesive CCT-19 is made in a similar manner by combining 30 g of VYCEL EF, 30 g VYCEL U, 60 g expanded polystyrene (EPS), 140 g Resinall 769 and 20 g of calcium carbonate ($CaCO_3$).

Adhesive CCT-23 is made in a similar manner by combining 30 g of VYCEL U, 30 g expanded polystyrene (EPS), 100 g of Resinall 1000, and 40 g of Resinall 769. Resinall 1000 is a fully hydrogenated cycloaliphatic hydrocarbon resin based on the thermal polymerization of diclyopentadiene mixtures. The resin has a very low color, low odor, and excellent thermal stability. It tackifies metallocene, ethylene vinyl acetate (EVA), styrenic block copolymers (SIS, SBS and SEBS), and amorphous poly-alpha olefins. This balance of properties makes it ideally suited for use in hot melt adhesives for packaging and non-woven assembly. Resinall 1000 has a softening point of 100° C. (212° F.) using the RTM-100 testing method.

Adhesive CCW-10 is made in a similar manner by combining 55 g of VYCEL EF, 45 g expanded polystyrene (EPS), 200 g Resinall 625 and 40 g magnesium silicide ($Mg_2Si$).

Adhesive CCW-11 is made in a similar manner by combining 55 g VYCEL EF, 45 g EPS, 200 g Resinall 625, 50 g calcium carbonate ($CaCO_3$), 40 g Resinall 1000, 2 g SILQUEST A-187 silane, and 5 g ARALDITE GY6010. SILQUEST A-187 silane is a specially formulated epoxy functional silane for use as an adhesion promoter in SPUR+ *prepolymer, urethane, epoxy, polysulfide, silicone and acrylic systems for caulks, coatings, sealants and adhesives. Its epoxy functionality allows SILQUEST A-187 silane to perform as a durable epoxy ring that is reactive with many organic functions. It also offers non-yellowing adhesion in many resin systems and has proven to increase the flexibility of systems when compared to other adhesion promoters under certain conditions. ARALDITE CY 6010 is a medium viscosity, unmodified liquid epoxy resin based on bisphenol A and epichlorohydrin. It is applied widely in both room temperature and heat cured systems.

Adhesive CCW-15 is made in a similar manner by combining 46 g VYCEL EF, 65 g EPS and 170 g NEVCHEM 220. NEVCHEM 220 is a thermoplastic low molecular weight, C9 hydrocarbon resin produced by catalytic polymerization of mixed aromatic and alicyclic monomers derived from petroleum feedstocks. It is manufactured by Neville Chemical Company.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A method of making a hot-melt adhesive comprising the steps of:
   a. heating an aromatic hydrocarbon process oil to a desired temperature that is below a boiling point of the process oil;
   b. adding a polymer consisting of expanded polystyrene to and dissolving the polymer in the heated process oil, wherein the polymer is added and dissolved until the hot-melt adhesive includes substantially equal parts by weight process oil and polymer;
   c. cooling the process oil and polymer mixture to room temperature resulting in a solid-form hot-melt adhesive.

2. The method according to claim 1, wherein the step of heating a process oil comprises heating the aromatic hydrocarbon process oil to a temperature between 170 degrees F. and a boiling point of the aromatic hydrocarbon processing oil.

3. The method of claim 1, further comprising the step of adding one or more tackifiers and dissolving the one or more tackifiers in the process oil and polymer.

4. The method of claim 3, wherein the one or more tackifiers is selected from a group consisting of hydrocarbon resins, rosin resins, terpene resins, and their mixtures.

5. A method of making a hot-melt adhesive comprising the steps of:
   a. heating a process oil to a desired temperature that is below a boiling point of the process oil;
   b. adding expanded polyethylene to and dissolving the expanded polyethylene in the heated process oil, wherein expanded polyethylene is added and dissolved until the hot-melt adhesive includes substantially equal parts by weight process oil and polyethylene;
   c. cooling the process oil and polyethylene mixture to room temperature resulting in a solid-form hot-melt adhesive.

6. The method according to claim 5, wherein the step of heating a process oil comprises heating an aromatic hydrocarbon oil to a temperature between 170 degrees F. and a boiling point of the aromatic hydrocarbon oil.

7. The method of claim 5, further comprising the step of adding one or more tackifiers and dissolving the one or more tackifiers in the process oil and expanded polyethylene.

8. The method of claim 7, wherein the one or more tackifiers is selected from a group consisting of hydrocarbon resins, rosin resins, terpene resins, and their mixtures.

* * * * *